Dec. 8, 1931.   J. F. BERNHARDT   1,835,134
SPRING
Filed Nov. 19, 1927
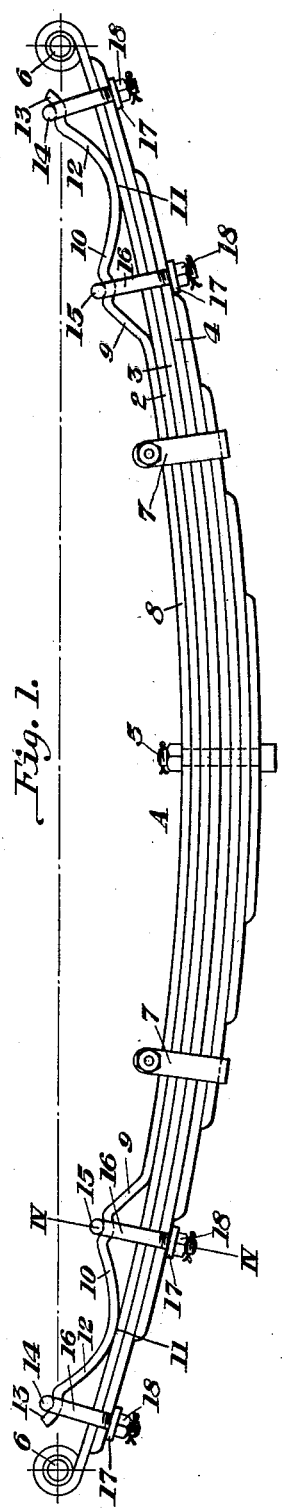
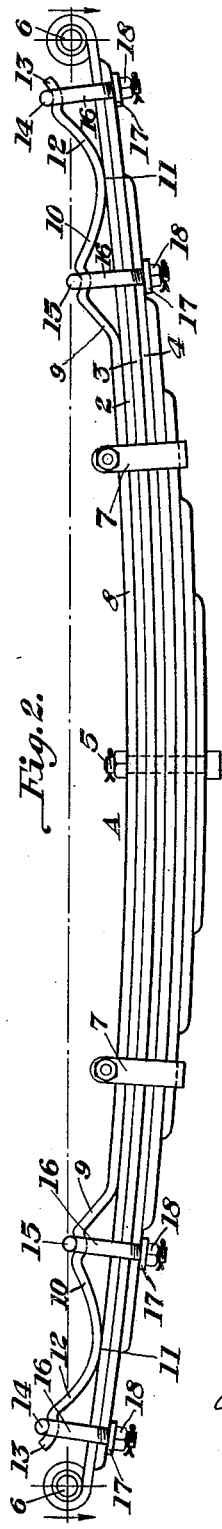
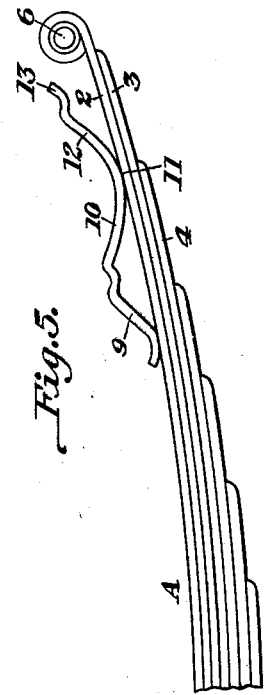
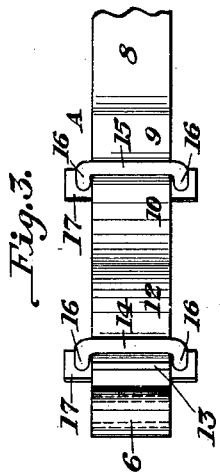
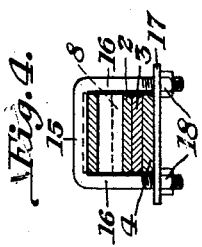
Inventor
Joseph F. Bernhardt
By C. M. Clarke
Attorney Patented Dec. 8, 1931

1,835,134

UNITED STATES PATENT OFFICE

JOSEPH F. BERNHARDT, OF DU BOIS, PENNSYLVANIA

SPRING

Application filed November 19, 1927. Serial No. 234,406.

My invention consists of an improvement in springs, and more particularly in leaf springs of the kind usually employed with vehicles of various kinds for spring suspension of loads.

In springs of the same general kind the supporting and re-acting effect of the spring member or members is mainly due to the resiliency of the leaves and certain added effect resulting from the frictional action between the leaves. In the ordinary manufacture of such springs the leaves are secured together either by surrounding clips or by bolts or in any other manner adapted to hold the leaves in as tight contact as possible. However, due to the wear of the leaves in use, such binding elements become less effective with use, with resulting reduction and friction, and in any case the main function of the spring is carried out through its resilient load supporting action, with alternating rebound, depending on the condition of the road surface.

Ordinarily, the rebounding action is approximately the same as the depressing action, resulting in undesirable reactive movements, necessitating the use of shock absorbers, snubbers and the like, designed to counter-act and absorb the re-active movements.

My invention has in view to provide means for effecting a wide range of frictional action within the spring itself, particularly between those portions of the spring leaves subject to the greatest extent of movement, whereby to effect in a spring of the leaf type a self-contained friction producing and shock absorbing element or member. I accomplish these results in a comparatively simple, efficient, and economical manner by forming portions of one of the leaves, or by combining with the main leaves, portions adapted to act in the manner of levers, with means for effecting a variable tension between two or more of the main leaves, preferably near their terminals, as shall be more fully hereinafter described.

Referring to the drawings showing certain preferred embodiments of the invention:

Fig. 1 is a view in side elevation of a leaf spring provided with my improvement, in normal extended or relaxed position;

Fig. 2 is a similar view showing the spring under a certain degree of compression;

Fig. 3 is a partial plan view of Fig. 1;

Fig. 4 is a cross sectional view on the line IV—IV of Fig. 1;

Fig. 5 is a partial view similar to Fig. 1, showing a modified construction and with the clamps removed.

Referring to the drawings, the spring A is composed of the usual series of main leaves 2, 3, 4, etc., of gradually decreasing length, and of any desired number, associated together and connected at the middle in any suitable manner, as by a bolt 5. The main or longest leaf 2 is provided with the terminal eyes 6 for shackle connection with the load supporting elements, other spring terminals, etc.

At suitable points the several leaves are connected by embracing clips or clamps 7 of well known construction, for holding the several leaves edgewise in alinement in a complete group, according to common well known practice.

The outer portions of the spring in their downward and upward movements, increase in their degree of vertical movement in proportion to their distance from the center.

Likewise, the relative longitudinal movement of the leaves and their frictional contact with each other is in the same relative proportion, with a variable frictional action dependent on the load and amount of movement, but greatly limited, due to the comparatively imperfect and limited degree of frictional adherence or binding contact.

For the purpose of greatly increasing such frictional movement, I provide in the supplemental leaf 8, embodying the present invention, terminal portions adapted to act as levers with means for varying the leverage action and the resulting degree of frictional bind and movement.

For such purpose the leaf 8 is arched upwardly as at 9, then downwardly as at 10, with an under rounded portion 11 bearing upon the upper face of the main spring 2 in the manner of a fulcrum, then arched upwardly as at 12 and having a reversely curved terminal 13.

Immediately back of said terminal, and at the highest point of the arch 9—10 the upper face of the spring is slightly depressed as shown, providing seats for the cross bar of the tightening clevis members 14 and 15. These members extend downwardly at each side in the form of a U-shaped yoke, and their side arms 16 extend through the terminals of cross bars 17 and are provided with tightening and loosening securing nuts 18.

By such means it will be seen that when tension is exerted on one or both of the clevis members tending to draw the upwardly extending arched portion or portions of the spring 8 toward the main spring 2, with fulcrum contact at 11, the compressive action of the device is greatly increased and may be definitely and accurately regulated, with a resulting increase or decrease in the frictional binding action between springs 2 and 3 and 3 and 4, or between any additional spring members which may be similarly associated.

The longest springs, having the greatest amount of compressive and re-actionary movement, also embody the extremes of frictional travel between themselves. By thus greatly increasing and regulating the binding action between these main active portions of the springs I accomplish the desirable result and effect of interposing a very large frictional resistance and reacting retardation against bounding and rebounding movement. At the same time the load supporting value of the spring is in no way reduced, but maintained at its maximum, with the accompanying self-contained and valuable quality of the inherent check or rebound.

Such check or control of the bounding and rebounding action is in proportion to the shock and, as stated, may be readily regulated, dependent on the load and the condition of the road surface.

By adjustment, the device can be set clear down to the extent of resiliency of the arched portions to any desired capacity within its limits and within a wide range of load and shock absorbing capacity.

While the elements of the improvement may be embodied in a single leaf as above described, the invention may also be utilized in the form of individual pieces as shown in Fig. 5, the clamps being removed. In such case the separate pieces may be easily and quickly applied to an ordinary standard spring and by the clamping action of the holding elements the same variable control may be effected.

The device is comparatively simple, being made of suitable quality spring steel, properly tempered, and does not add materially to the weight of the main spring.

A further valuable advantage in the construction whether utilized in either form, is that the thrust of the load instead of being downward and outward as is usual, is by reason of the great frictional qualities imparted through leverage, directed more definitely toward the center of the spring with each downward movement. This imparts a greatly increased carrying capacity over the present ordinary type of spring construction, bringing into play all frictional resistance embodied in the spring, within its limits. Because of this greatly increased carrying capacity, the lighter and consequently less costly springs may be employed to carry the desired load.

It will be understood that the invention may be variously changed in different details or other features by the skilled mechanic and utilized in any suitable size, proportions, weight, etc., dependent on the conditions of use, and that all such changes are to be understood as within the scope of the following claims.

What I claim is:—

1. The combination with a main spring formed of a plurality of superposed leaves adapted to be connected to a vehicle of a friction increasing device comprising a resilient strip member having an inner portion arched upwardly and then downwardly and then reversely rounded forming a fulcrum bearing portion and then extended upwardly and outwardly forming a free terminal, said fulcrum bearing portion being in engagement with the upper face of the uppermost leaf near an end thereof, and clamping members engaging said main spring and said arched and terminal portions whereby downward deflection of said end of the main spring increases the pressure of said resilient strip member to increase the friction between said superposed leaves.

2. The combination with a main spring formed of a plurality of superposed leaves adapted to be connected to a vehicle of a friction increasing device comprising a resilient strip member having an inner portion arched upwardly and then downwardly and then reversely rounded forming a fulcrum bearing portion and then extended upwardly and outwardly forming a free terminal, said fulcrum bearing portion being in engagement with the upper face of the uppermost leaf, said arched and terminal portions having transverse seats, and clamping members positioned on and engaging said seats and said main spring whereby downward deflection of said end of the main spring increases the pressure of said resilient strip member to increasing the friction between said superposed leaves.

In testimony whereof I hereunto affix my signature.

JOSEPH F. BERNHARDT.